(No Model.)
H. BORGELT, Jr., & L. P. DORRELL.
CULTIVATOR.
No. 300,563. Patented June 17, 1884.
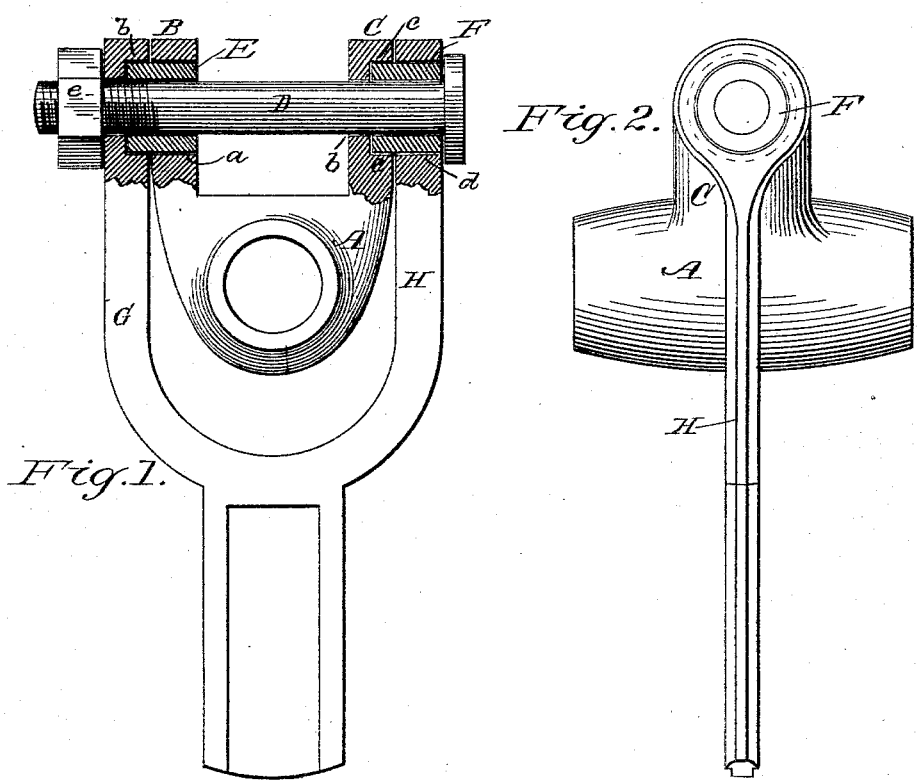

UNITED STATES PATENT OFFICE.

HENRY BORGELT, JR., AND LUCIAN P. DORRELL, OF HAVANA, ILLINOIS.

CULTIVATOR.

SPECIFICATION forming part of Letters Patent No. 300,563, dated June 17, 1884.

Application filed May 10, 1883. (No model.)

*To all whom it may concern:*

Be it known that we, HENRY BORGELT, Jr., and LUCIAN P. DORRELL, citizens of the United States, residing at Havana, county of Mason, and State of Illinois, have invented certain new and useful Improvements in Cultivators; and we do hereby declare that the following is a full, clear, and exact description of the same, reference being had to the accompanying drawings, in which—

Figure 1 is a front elevation of our invention, partly in section; and Fig. 2, a side elevation of the same.

The present invention has relation to certain new and useful improvements in means for attaching the plow-beam to the axle of a cultivator-frame; and the object thereof is to provide a coupling device simple in construction, whereby the teeth of the cultivator or shovels of the plow may be raised or lowered to plow as deep as may be desired, while the peculiar construction of the coupling renders it both strong and durable and capable of being manufactured at a comparatively small cost. These several objects we attain by the construction substantially as shown in the drawings, and hereinafter described and claimed.

In the accompanying drawings, A represents a suitable sleeve, through which passes the axle of the cultivator-frame, said sleeve being cast or otherwise provided with arms B C, extending out at right angles thereto. The arm B has a hole, $a$, through it of the necessary diameter to receive a thimble, E, while the arm C upon its outer side is formed with a mortise, $c$, of equal diameter to the hole $a$, to receive the inner end of a similar thimble, F.

The clevis consists of the two arms G H, the arm G having a mortise, $b$, similar to the mortise in the arm of the sleeve A, while the arm H has a hole, $d$, like that formed in the arm of the sleeve. A headed screw-bolt, D, passes through the arms of the sleeve and the arms of the clevis, and also through the thimbles, the bolt holding the arms of the sleeve and clevis together by a nut, $e$, engaging the screw-threaded end of the bolt, thereby providing a simple and effective means for coupling the clevis of the plow or cultivator beam to the axle of the cultivator-frame.

Having now fully described our invention, what we claim as new, and desire to secure by Letters Patent, is—

A clevis of a plow or cultivator beam, having suitable arms, one of said arms having upon its inner side a mortise, and the opposite arm a hole of equal diameter, in combination with a sleeve through which the axle passes, provided with arms having a hole and a mortise similar to those on the arms of the clevis, and thimbles fitting therein, and a bolt passing through the arms to hold them together, the mortises being arranged with relation to each other, and also the thimbles, as shown and described.

HENRY BORGELT, JR.
L. P. DORRELL.

Witnesses:
E. A. WALLACE,
WILLIAM BORGELT.